June 16, 1942.  N. B. NEWTON  2,286,502
CLUTCH PLATE
Filed Feb. 18, 1939  2 Sheets-Sheet 2

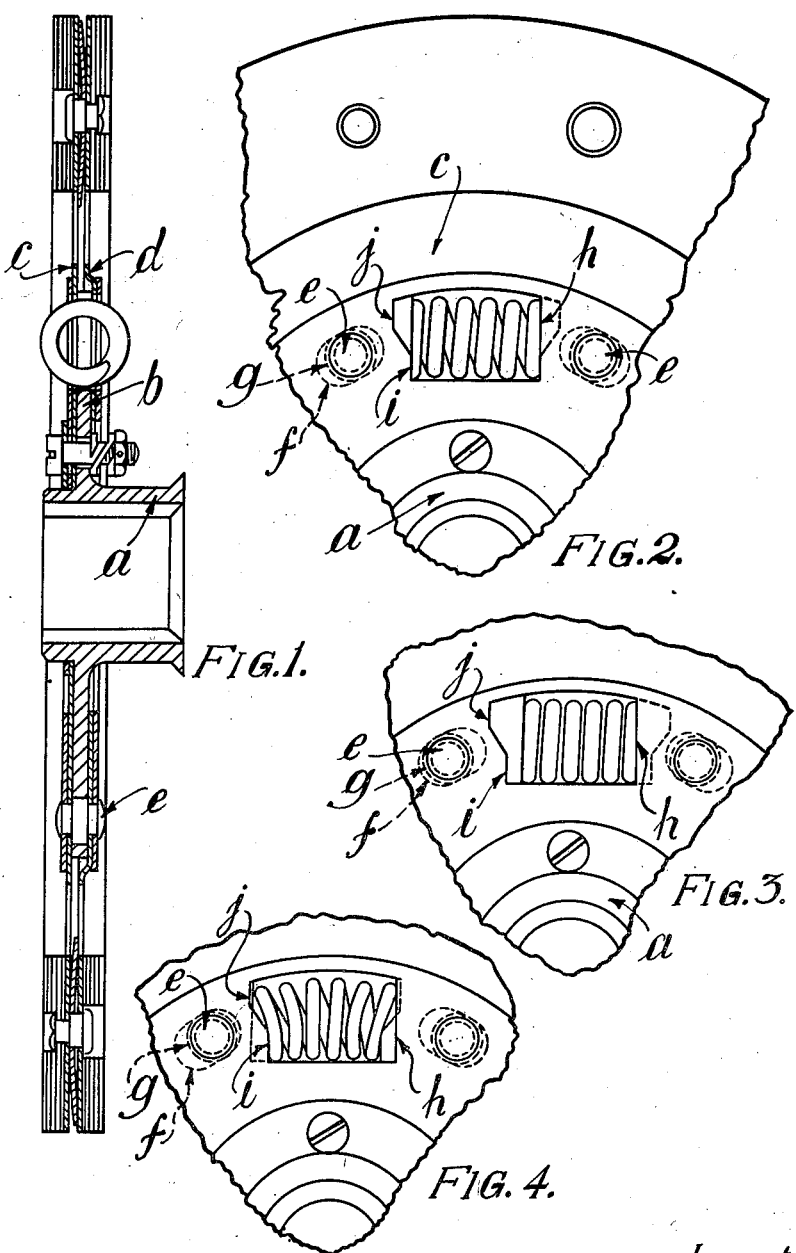

Inventor:
Noel B. Newton.
By his Attorney: Walter Gunn.

Patented June 16, 1942

2,286,502

UNITED STATES PATENT OFFICE 2,286,502

CLUTCH PLATE

Noel Banner Newton, Acton, London, England

Application February 18, 1939, Serial No. 257,090
In Great Britain February 25, 1938

5 Claims. (Cl. 192—68)

This invention relates to clutch plates of the kind comprising an outer part or plate proper carrying the friction surface or lining, such part being rotatably mounted on a hub and having spring cushion means providing a resilient restraint to relative rotational movement of the outer part on the hub.

It is well known in clutch plates of the kind stated to form the hub with a disc-like flange and to construct the outer part as a single disc located against one face of the said flange, the spring cushion means comprising coil springs arranged in registering openings in the flange and disc, so as to be compressed between approaching ends of such openings upon relative rotation of the disc in either direction.

In the earliest forms of clutch plates of the kind referred to, all such springs have been brought into action simultaneously in either direction, as for example, would result in the detailed construction above described if the registering openings are all the same size and come into exact register simultaneously. It has, however, been proposed to arrange the openings so that they register in groups which do not come into register simultaneously. Thus the springs of one group act against those of another, at least for initial movements on either side of a position of equilibrium, such condition permitting more immediate relative movement upon application of the load. By such means it was proposed to bring the springs into action as required under different conditions of operation, so that the resistance to relative rotational movement would increase in defined stages in at least one direction of movement, and so that the resistance in one direction might be different from that in the other.

The object of the invention is a clutch of the kind described having an improved construction and arrangement of parts in which is provided the condition of normal equilibrium for quick response and the means for providing different resistance in the two directions of movement, such construction embodying a new underlying principle of construction.

According to the invention, a clutch plate assembly of the kind described is characterised by cushioning means comprising coil springs engaging the two relatively movable parts in such manner as to subject the same to a force, or force couple, which will cause, not only compression but substantial axial flexing of the spring or relative distortion of its convolutions upon relative movement of the parts in at least one direction.

In the accompanying drawings:

Fig. 1 is a sectional elevation of one example of clutch plate made in accordance with the invention.

Fig. 2 is a front elevation of part of the clutch plate shown in Fig. 1 with the spring in its normal position.

Fig. 3 shows normal compression of the spring.

Fig. 4 shows axially distorted compression of the spring.

Figure 5:
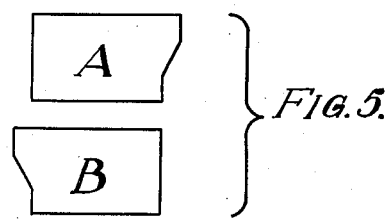
Fig. 5 shows the individual shape of the apertures in the flange and discs respectively of the arrangement shown in Fig. 1.

As illustrated in Figs. 1 to 5, the clutch plate comprises a hub $a$, with disc-like flange $b$ and a conjoint pair of discs $c$ and $d$, one on each side of and thereby embracing the flange, the two discs being secured together by stop rivets $e$ passing through arcuate slots $f$ in the flange so that the rivets perform the dual purpose of ensuring conjoint movement of the discs and of limiting their rotational movement relative to the flange and with springs located in openings. The rivets also carry fibre rollers $g$ which co-operate with the arcuate slots so as to centralise the discs on the hub. Fig. 5 shows the openings A and B in the flange and disc respectively. Hitherto, it has been the practice to make such spring openings square-ended. Therefore, when made with those in the flange and in conjoint discs of equal size and shape, as relative movement occurred between the two parts, the forces applied to each spring would be substantially balanced about the axis of the spring, the end of the opening in the flange engaging one end of the spring across its diameter, whilst the other ends of the openings in the two conjoint discs both engage the other end of the spring, substantially as chords equally spaced on either side of the spring axis. Of course, it is obvious that as the parts move to compress the spring, the ends of the openings which engage the opposite ends of the spring and hereinafter termed the complementary ends lose their parallel disposition, but as the angle of rotation is only small, any resultant axial flexing or distortion of the spring is only small and of no substantial magnitude. Instead therefore of making the openings square ended, in one example of the invention, as shown in Figs. 2, 3 and 4, the openings in the discs are made with one end $h$ square and the other end formed with steps $i$ and $j$. The holes in the flange are similar but reversed in hand. In the conjoint discs, the registering openings are all equal and of the same hand, whilst in the flange of the hub they are of the other hand, that is to say, when the openings are in register, as in Fig. 2, to receive the springs, the square end $h$ of the opening in the disc registers with the inner step of the non-square end of the opening in the flange of the hub. The inner steps of the complementary ends thus face each other.

Figure 6:
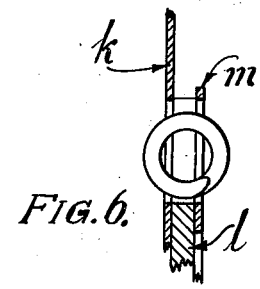
Fig. 6 is a sectional elevation of part of a modified construction.

As shown in Fig. 6 a single disc $k$ is arranged beside the flange $l$ whilst a ring or plate $m$ is arranged on the other side of the flange. The openings in the ring and disc are the same and the ring is secured to its disc by stop rivets in exactly the same way as the two discs were secured together.

In operation, it is obvious that, as the parts move relatively in one direction the spring is compressed (see Fig. 3) between the complementary square ends of the openings, as in previously known constructions, but as the parts move relatively in the other direction the stepped (non-square) complementary ends approach each other and induce not only compression but substantial distortion or opposite axial deflection at each end of the convolutions of the springs (see Fig. 4), the compression being down one side of the spring, whilst the other side is allowed to expand. Also, it is obvious that, as the springs will necessarily have some initial compression or load, an equilibrium effect will obtain in that each spring will tend to assume a normal position either as shown in Fig. 2 or if the opening in the flange is shorter or longer than the opening in the discs, a position partially flexed or distorted at which the spring load and the resistance to distortion balance out. There will also be no sudden change of resistance or defined stage in the action of the spring but a smooth increase of resistance unless, or until, there is a change over of contact owing to the different shapes of the ends. Until such change over occurs and during at least the initial stages of movement in either direction from the normal position of equilibrium, each end of the spring will be in contact simultaneously with the ends of the openings in the discs as well as with the end of the opening in the flange. If the permitted movement is sufficiently large, a change over of contact may occur so that subsequent further movement brings one end of the spring into engagement with the discs only and the other end only with the flange. In the example above described, the spring may then be compressed between the square ends or the non-square ends of the openings and, therefore, the convolutions of the spring are either substantially normally spiral or are distorted. As each spring is self-contained in its action, any number of springs may be employed.

Figure 7:
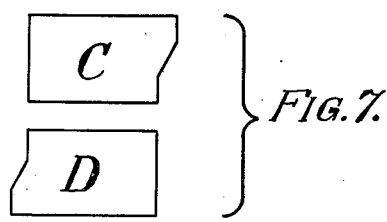
Fig. 7 shows another selection of apertures similar to those shown in Fig. 3.
Figure 8:
Figs. 8, 9 and 10 show the shape of through aperture in the normal, forward and reverse positions respectively of the openings shown in Figure 7.
Figure 9:
Figure 10:
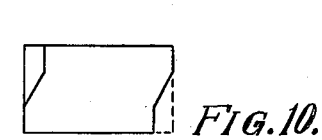
Figure 11:
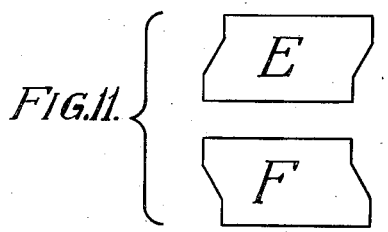
Fig. 11 shows the individual shapes of alternative apertures in the flange and discs.
Figure 12:
Figs. 12, 13 and 14 show the shape of through aperture in the normal, forward and reverse positions respectively.
Figure 13:
Figure 14:

As shown in Fig. 7, C and D show respectively the openings in the disc and flange wherein the construction above described is modified to the extent that the two complementary stepped ends of the openings are stepped parallel. This formation will cause the two ends of the spring to be distorted in the same directions when the parts move into the position of Fig. 10, whilst in the normal and forward direction positions (Figs. 8 and 9) the coils of the springs are straight or directly compressed in normal manner.

In a further modification of the invention, as shown in Figs. 11 to 14, both ends of all the openings E and F are stepped in parallel directions, those in the openings E being oppositely stepped relative to those in the openings F. In such arrangement the spring distortion will be the same as in Figures 1 to 3 in each direction of movement but with this difference that the spring distortion will be in opposite directions from the normal positions of equilibrium, and along opposite sides. As such sides are at different distances from the centre of the disc a different resistance to rotational movement is obtained.

It will be evident from the drawings and description that in every example each end wall of the registering openings is adapted to engage the spring at two points and that the shaping of the end walls is such that in all relative positions of the overlapping parts there is always at least one of such engagement points out of control with the spring, and that thereby the spring is differently compressed in the two directions of movement giving different resistance to such movement.

Obviously there may be other conceivable shapes of openings than those above described, which will provide the required effect which are within the invention as embodying the new principle of construction, providing in at least one direction not only compression but substantial axial flexing of the spring or relative distortion of its convolutions from its normal spiral form.

There will of course be provided some means for retaining the springs in their apertures of which means there are many known forms. No such means are illustrated in the drawings herewith as they would tend to confuse the drawings and really are no part of this invention as any known means could be employed, as for example that described in the specification of my co-pending application for U. S. Patent Serial No. 257,089 of even date.

What I claim is:

1. A driven plate assembly for friction clutches comprising a hub member having a flange, a friction member comprising a friction plate overlapping said flange, said flange and friction plate being provided in their overlapped parts with registering openings and coil springs seated in said openings between the end walls thereof, each end wall being adapted to engage the end of its spring at two points, the immediately adjacent end walls being shaped so that at each end of a spring there is always at least one of the engagement points of the end walls out of contact with the spring.

2. A driven plate assembly for friction clutches comprising a hub member having a flange, a friction member comprising a friction plate overlapping said flange, said flange and friction plate being provided in their overlapped parts with registering openings and coil springs seated in said openings between the end walls thereof, one end wall of an opening in the flange and the opposite and complementary end wall of the registering opening in the friction plate being stepped whilst the other opposite end complementary end walls are relatively straight so as to compress the spring differently in the two directions of relative movement of the friction plate and flange to provide different resistances.

3. A driven plate assembly for friction clutches comprising a hub member having a flange, a friction member comprising a friction plate overlapping said flange, said flange and friction plate being provided in their overlapped parts with registering openings and coil springs seated in said openings between the end walls thereof, one end wall of an opening in the flange and the opposite and complementary end wall of the registering opening in the friction plate being oppositely stepped whilst the other opposed and complementary end walls are relatively straight so as to compress the spring along one side in one direction of relative movement and along both sides in the other direction of movement.

4. A driven plate assembly for friction clutches according to claim 2 in which the stepped complementary end walls are inclined in the same direction so that for one direction of relative movement the compression is diagonal of the spring.

5. A driven plate assembly for friction clutches comprising a hub member having a flange, a friction member comprising a friction plate overlapping said flange, said flange and friction plate being provided in their overlapped parts with registering openings and coil springs seated in said openings between the end walls thereof, one end wall of an opening in the flange and the opposite and complementary end wall of the registering opening in the friction plate being oppositely stepped whilst the other opposed and complementary end walls are oppositely stepped relatively to each other and to the first mentioned end walls so that in one direction of movement the compression occurs along one side of the spring and in the other direction of movement the compression occurs along the other side of the spring.

NOEL BANNER NEWTON.